US012590492B1

(12) United States Patent
Joldersma et al.

(10) Patent No.: US 12,590,492 B1
(45) Date of Patent: Mar. 31, 2026

(54) REMOVABLE STEP LADDER FOR RECREATIONAL VEHICLE

(71) Applicants:Rock Run Capital, LLC, Elkhart, IN (US); MORryde International, Inc., Elkhart, IN (US); Heng's Industries (USA) LLC, Elkhart, IN (US)

(72) Inventors: David K. Joldersma, Elkhart, IN (US); Tyler Rockenbaugh, Elkhart, IN (US); Yuling Wang, Hangzhou (CN)

(73) Assignees: Rock Run Capital, LLC, Elkhart, IN (US); MORryde International, Inc., Elkhart, IN (US); Heng's Industries (USA), LLC, Elkhart, IN (US)

( * ) Notice: Subject to any disclaimer, the term of this patent is extended or adjusted under 35 U.S.C. 154(b) by 1218 days.

(21) Appl. No.: 17/460,842

(22) Filed: Aug. 30, 2021

Related U.S. Application Data

(63) Continuation-in-part of application No. 15/953,840, filed on Apr. 16, 2018, now Pat. No. 11,105,152, which is a continuation of application No. 14/328,287, filed on Jul. 10, 2014, now Pat. No. 9,945,179.

(60) Provisional application No. 61/844,895, filed on Jul. 11, 2013.

(51) Int. Cl.
| | |
|---|---|
| *E06C 5/24* | (2006.01) |
| *B60R 3/00* | (2006.01) |
| *E06C 5/02* | (2006.01) |
| *E06C 5/32* | (2006.01) |

(52) U.S. Cl.
CPC ............... *E06C 5/24* (2013.01); *B60R 3/005* (2013.01); *B60R 3/007* (2013.01); *E06C 5/02* (2013.01); *E06C 5/32* (2013.01)

(58) Field of Classification Search
CPC ..... E06C 5/24; E06C 5/02; E06C 5/44; E06C 5/04; E06C 5/00; E06C 5/20; B60R 3/005; B60R 3/007
USPC ........................................................ 182/127
See application file for complete search history.

(56) References Cited

U.S. PATENT DOCUMENTS

| | | | |
|---|---|---|---|
| 2,794,583 | A | 6/1957 | Ernst |
| 3,020,972 | A | 2/1962 | Hockett |
| 3,476,211 | A | 11/1969 | Cormier |
| 3,556,248 | A | 1/1971 | Brown |

(Continued)

FOREIGN PATENT DOCUMENTS

| | | |
|---|---|---|
| FR | 2729900 A1 | 8/1996 |
| JP | 11292192 A | 10/1999 |
| JP | 2000326794 A | 11/2000 |

*Primary Examiner* — Christopher Garft
(74) *Attorney, Agent, or Firm* — Krieg DeVault LLP; Daniel Tychonievich

(57) ABSTRACT

In one embodiment of the invention, a ladder and method for removably mounting the ladder on a recreational vehicle is disclosed. The ladder may be removed and used as a standard step ladder. The ladder includes a top end and two pairs of legs extending downward from the top end. At least one of the pairs of legs is pivotally mounted to the top end, and a pivoting limiting mechanism is provided to allow the pairs of legs to fold adjacent one another or unfold to a use position as a step ladder. An upper mounting arrangement is attached to the recreational vehicle. The arrangement includes two free ends extending downwardly therefrom; and the top end of the ladder includes receivers for receiving free ends of the upper mounting arrangement.

19 Claims, 19 Drawing Sheets

(56) References Cited

U.S. PATENT DOCUMENTS

| | | | |
|---|---|---|---|
| 3,858,905 A | | 1/1975 | Peebles |
| 4,023,647 A | | 5/1977 | Confer |
| 4,057,125 A | | 11/1977 | Kroft |
| 4,249,683 A | | 2/1981 | Park |
| 4,311,209 A | | 1/1982 | Primerano |
| 4,413,801 A | | 11/1983 | Lancaster |
| 4,482,029 A | | 11/1984 | Prochaska |
| 5,117,940 A | | 6/1992 | Garelick |
| 5,282,339 A | | 2/1994 | Devlin |
| 5,370,204 A | | 12/1994 | Fox |
| 5,927,434 A | | 7/1999 | Wu |
| 6,003,633 A | | 12/1999 | Rolson |
| 6,105,720 A | | 8/2000 | Kumher |
| 6,152,261 A | * | 11/2000 | Hoey .................. E06C 7/48 |
| | | | 182/107 |
| 6,158,549 A | * | 12/2000 | Hartman, Jr. ........... E06C 7/48 |
| | | | 182/206 |
| 6,315,078 B1 | | 11/2001 | Kumher |
| 6,321,873 B1 | | 11/2001 | LaBrash |
| 6,378,654 B1 | * | 4/2002 | Ziaylek, Jr. ............ E06C 5/02 |
| | | | 182/127 |
| 6,394,229 B1 | * | 5/2002 | Hastreiter .............. E06C 1/345 |
| | | | 248/210 |
| 6,401,861 B1 | | 6/2002 | Marszalek |
| 6,942,271 B1 | | 9/2005 | Jamison |
| 7,066,299 B1 | * | 6/2006 | Fleming .................. E06C 7/48 |
| | | | 182/127 |
| 7,516,997 B2 | | 4/2009 | Kuznarik |
| 7,861,663 B2 | | 1/2011 | Sedlack, II |
| 8,393,586 B1 | | 3/2013 | Mercure |
| 8,839,908 B2 | | 9/2014 | Davis, Jr. |
| 8,893,853 B2 | | 11/2014 | Kennedy |
| 9,334,689 B2 | | 5/2016 | Sautter, Jr. |
| 9,914,396 B1 | | 3/2018 | Scott |
| 10,883,310 B2 | * | 1/2021 | Johnson .................. E06C 7/48 |
| 2002/0153201 A1 | | 10/2002 | Warford |
| 2004/0069566 A1 | | 4/2004 | Bareket |
| 2004/0232649 A1 | | 11/2004 | Lambie |
| 2005/0039983 A1 | | 2/2005 | Tombarello |
| 2005/0126855 A1 | | 6/2005 | Tilley |
| 2005/0139559 A1 | | 6/2005 | Trusty |
| 2005/0285365 A1 | | 12/2005 | Manser |
| 2006/0108179 A1 | | 5/2006 | Sieb |
| 2006/0201747 A1 | * | 9/2006 | Walton ..................... E06C 1/36 |
| | | | 182/206 |
| 2006/0261623 A1 | | 11/2006 | Kuznarik |
| 2006/0272896 A1 | | 12/2006 | Rajewski |
| 2008/0087496 A1 | | 4/2008 | Graffy |
| 2008/0236947 A1 | | 10/2008 | Lin |
| 2008/0277199 A1 | | 11/2008 | Castonguay |
| 2009/0020360 A1 | | 1/2009 | May |
| 2009/0200108 A1 | | 8/2009 | Rathbone |
| 2010/0071994 A1 | | 3/2010 | Tseng |
| 2010/0200331 A1 | | 8/2010 | Hager |
| 2011/0139544 A1 | | 6/2011 | Frick |
| 2013/0292205 A1 | | 11/2013 | Frick |
| 2015/0251607 A1 | * | 9/2015 | Sautter, Jr. ............. B60R 11/02 |
| | | | 224/548 |
| 2016/0221510 A1 | | 8/2016 | Petersen |
| 2018/0229664 A1 | * | 8/2018 | Paisley ................. F16M 13/02 |
| 2019/0061629 A1 | * | 2/2019 | Gemme ................. E06C 7/182 |

\* cited by examiner

REMOVABLE STEP LADDER FOR RECREATIONAL VEHICLE

This continuation in part application claims priority from U.S. continuation non-provisional patent application Ser. No. 15/953,287 filed on Apr. 16, 2018, which claims priority to non-provisional patent application Ser. No. 14/328,287 filed on Jul. 10, 2014, which claimed priority from U.S. provisional patent application Ser. No. 61/844,895 filed on Jul. 11, 2013, the complete disclosures of which are incorporated herein by reference.

BACKGROUND OF THE INVENTION

This invention relates to a ladder for use with a recreational vehicle, and in particular to a ladder being mountable for access to an upper or roof area of the recreational vehicle and being further removable from the recreational vehicle for use as a standard step ladder.

It is well known to have ladders mounted to or otherwise attached to recreational vehicles. Typically, the ladders are mounted at the back end or sides of the recreational vehicle to allow access to the roof. Equipment or other goods may be stored on the roof of the recreational vehicle and access also allows cleaning and maintenance of the roof or any fixtures extending from the roof, such as air conditioning units.

Furthermore, many recreational vehicle owners travel with a step ladder to allow access to the roof of the recreational vehicle at points other than where the ladders are mounted. Step ladders are also used for other purposes, such as at a camp site where access to an elevated position is desired. A problem is that storage space is limited and at a premium in recreational vehicles, so it is difficult to find a suitable and secure place to store the step ladder for travel and while camping. As closet space is limited, some recreational vehicle owners will use straps, ropes, or bungee cords to mount a step ladder to the recreational vehicle's attached ladder or to other areas on the exterior of the recreational vehicle where the ladder might be secured. Such mounting may impair the use of the recreational vehicle's attached ladder, cause an unsightly appearance or cause a hazard if it becomes dislodged during travel. Accordingly, it is desirable to have a combination step ladder that can be attached to and serve as the main ladder of the recreational vehicle for access to the roof thereof and/or is removable for use apart and away from the recreational vehicle.

SUMMARY OF THE INVENTION

In one embodiment of the invention, a ladder and method for removably mounting the ladder on a recreational vehicle is disclosed. The ladder may be removed and used as a standard step ladder. The ladder includes a top end and two pairs of legs extending downward from the top end. At least one of the pairs of legs is pivotally mounted to the top end, and a pivoting limiting mechanism is provided to allow the pairs of legs to fold adjacent one another or unfold to a use position as a step ladder. An upper mounting arrangement is attached to the recreational vehicle. The arrangement includes two free ends extending downwardly therefrom; and the top end of the ladder includes receivers for receiving free ends of the upper mounting arrangement.

The receivers at the top end of the ladder may include apertures therein for receiving the free ends of the upper mounting arrangement, and the free ends can be tubular members of the mounting arrangement.

The tubular members may have a bend and extend outwardly therefrom above the receivers and another bend to extend the tubular members back vertically.

The ladder and method for removably mounting the ladder on a recreational vehicle may further include a lower mounting arrangement that may include an expandable width bracket mounted to the lower end of one pair of the legs on the ladder and extensions mounted to the bottom of the expandable width bracket.

Another bracket may be mounted to the recreational vehicle for receiving the extensions. The bracket mounted on the recreational vehicle may include upwardly extending extensions that connect to the extensions extending downwardly from the expandable width bracket attached to the ladder.

The extensions attached to the bracket on the recreational vehicle may include T-shaped apertures and the extensions extending down from the ladder bracket may include circular apertures. Fasteners may extend through the apertures for connecting the brackets mounted to the ladder and the recreational vehicle together.

The bracket mounted to the recreational vehicle can be mounted on a bumper thereof. Alternately, the bracket attached to the recreational vehicle may be mounted to the back of the recreational vehicle and the extensions may extend backwardly therefrom.

In another embodiment of the invention, the ladder may be removed and used as a standard step ladder. The ladder may include a top end and two pairs of legs extending downward from the top end. At least one of the pairs of legs is pivotally mounted to the top end, and a pivoting limiting mechanism is provided to allow the pairs of legs to fold adjacent one another or unfold to a use position as a step ladder. A lower mounting arrangement for attaching the ladder to the recreational vehicle is also provided. The arrangement includes a first bracket mounted to the bottom of one pair of step ladder legs, a second bracket mounted to the recreational vehicle, and fasteners to connect the brackets together.

One of the brackets may have an expandable width and each of the brackets can include extensions extending therefrom. Each of the extensions may include apertures and one set of apertures can have a T-shaped configuration.

The second bracket can be mounted to a bumper of the recreational vehicle or it can be mounted directly to a rear end of the recreational vehicle.

An upper mounting arrangement may also be provided that includes two free ends extending downwardly therefrom and receivers in the ladder for receiving the free ends of the upper mounting arrangement. The receivers at the top of the ladder may include apertures therethrough for receiving the free ends of the upper mounting arrangement. The free ends may be tubular members of the mounting arrangement.

In another aspect of the invention of a ladder and recreational vehicle combination, the ladder is removably mountable on the recreational vehicle, wherein the ladder is a foldable ladder and the combination includes the ladder having a top end and two pairs of legs extending downward from the top end, at least one of the pairs of legs is pivotally mounted to the top end, and a pivoting connection allows the pairs of legs to fold adjacent one another or unfold to a use position. The combination includes an upper mounting arrangement attached to the recreational vehicle with at least one horizontal ladder rung and two free ends extending downwardly therefrom. A bottom step of the ladder has a pair of receiving holes extending therethrough configured to receive the free ends of the upper mounting arrangement.

The ladder and recreational vehicle combination can have the top end of the ladder configured to be received and secured in a lower mounting arrangement. The free ends can be tubular members of the upper mounting arrangement and the tubular members can have tapered ends.

The lower mounting arrangement can include a lower platform, a securing panel and side panels wherein the side panels are configured to receive the pairs of legs therebetween. The lower mounting arrangement can include at least one back mounting member to mount the lower mounting arrangement to the recreational vehicle. The securing panel may be pivotally attached to the lower platform, to facilitate moving the securing panel to an open receiving position to allow the lower mounting arrangement to receive the top end of the ladder. In one embodiment, the securing panel is pivoted the securing panel and lower platform can include aligned apertures in extensions for receiving a shackle of a lock to lock the ladder to the lower mounting platform.

In one embodiment, the lower mounting arrangement is mounted to the back end of the recreational vehicle.

In one embodiment of the invention the steps of the ladder have a cross-sectional configuration that includes a bottom stepping surface and a top stepping surface, the bottom stepping surface and top stepping surface being at an angle to one another. In this embodiment, the bottom stepping surface is perpendicular to the length of the legs and horizontal when mounted on the recreational vehicle to be used as a stepping surface for a user climbing the ladder on the recreational vehicle.

In another aspect of the invention, a ladder and mounting assembly combination is provided that is removably mountable on a recreational vehicle, wherein the ladder is a foldable ladder. The ladder includes a top end and two pairs of legs extending downward from the top end, at least one of the pairs of legs being pivotally mounted to the top end, and a pivoting limiting mechanism allowing the pairs of legs to fold adjacent one another or unfold to a use position for use when removed from the recreational vehicle. The combination also includes a lower mounting arrangement for attaching the ladder to a recreational vehicle. The lower mounting arrangement includes a lower platform and securing panel, wherein the securing panel is pivotally attached to the lower platform, to facilitate moving the securing panel to an open receiving position to allow the lower mounting arrangement to receive the top end of the ladder.

In one embodiment, the securing panel is pivoted downward to secure the top end of the ladder in the lower mounting arrangement. The securing panel and lower platform can include extensions with aligned apertures in the extensions for receiving a shackle of a lock to lock the ladder to the lower mounting platform.

The ladder and mounting assembly combination can also include an upper mounting arrangement attached to the recreational vehicle, the arrangement having at least one horizontal ladder rung and tubular members each having free ends extending downwardly therefrom. The bottom step of the ladder can include a pair of receiving holes extending therethrough configured to receive the free ends of the upper mounting arrangement, and the free ends of the tubular members can be tapered for ease of insertion in the receiving holes.

In one embodiment, the ladder and mounting assembly includes mounting brackets having receiving portions to receive flanges attached to support members of the upper mounting arrangement.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Figure 1:
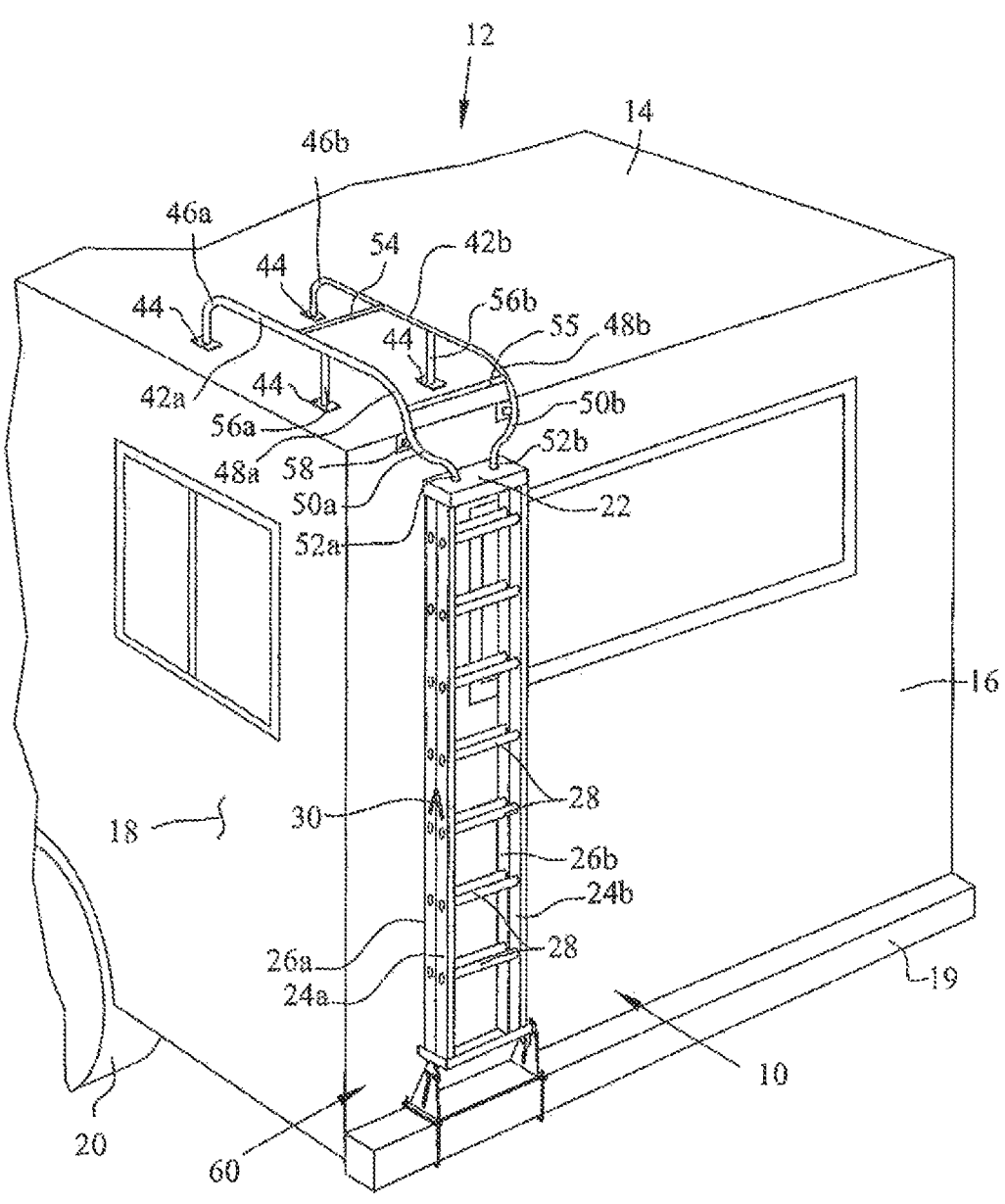
FIG. 1 is a perspective view of one embodiment of the subject invention showing a removable ladder mounted on a recreational vehicle.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Now referring to FIG. 1, a removable ladder, generally indicated as 10, is shown mounted to a recreational vehicle, generally indicated as 12. Recreational vehicle 12 may be of any type or variety of such vehicles as are well known. Recreational vehicle 12 includes a top or roof 14, a rear or back end 16, a side 18, and a plurality of wheels 20 on which recreational vehicle 12 moves. Recreational vehicle 12 also includes a bumper 19 as is well known.

Removable ladder 10 is of a well-known variety and commonly called a step ladder. Such ladders, as is well known, have a top end or platform 22 and two pairs of legs 24a, b, and 26a, b extending downward from top end 22. Receiving holes 23 are provided in top end 22 for purposes discussed below. At least one of the pairs of legs 24a, b or 26a, b are pivotally mounted to platform 22 as is well known to allow the legs to fold up against one another for storage or leaning use as ladder 10 is depicted in FIG. 1, or to pivotally open up to allow ladder 10 to stand freely on its own for use as a step ladder. Ladder 10 further includes horizontal rungs or steps 28 extending between legs 24a and 24b and a pair of pivoting limit stops 30 attached to and connecting legs 24a to 26a and 24b to 26b, as is well known.

To facilitate mounting removal ladder 10 to recreational vehicle 12, an upper mounting arrangement is shown, generally indicated as 40, and a lower mounting arrangement is shown, generally indicated as 60.

Upper mounting arrangement 40 includes a pair of tubular members 42a, 42b, mounted generally parallel and adjacent to one another. Upper mounting arrangement 40 may be manufactured from aluminum members or other suitable corrosion resistant materials. One end of tubular members 42a, b has flanges 44 attached thereto, such as by welding or other known means. Flanges 44 may include holes and be attached using fasteners or other known means to roof 14 of recreational vehicle 12. Each tubular member 42a, 42b extends generally vertically upward from flange 44/roof 14, but further includes respective bends 46a, 46b. At the rear end 16 of recreational vehicle 12, tubular members 42a,b include 90° bends 48a, 48b, respectively, directing tubular members downwardly out over rear end 16. Tubular members 42a, 42b include additional bends 50a, 50b, respectively, bending tubular members 42a, 42b towards one another at approximately a 45° angle. Tubular members 42a, 42b include one additional bend each 52a, 52b, respectively, wherein the tubular members bend back vertically again and parallel to one another, ending in parallel free ends 53a, b, respectively.

Upper mounting arrangement 40 further includes two generally horizontal cross supports 54 and 55 extending between and attached to tubular members 42a, 42b. Supports 54 and 55 may be welded to or otherwise attached to tubular members 42a, 42b in a known manner. Upper mounting arrangement 40 further includes vertical supports 56a, 56b, attached to tubular members 42a, 42b, respectively. Vertical supports 56a, 56b may be welded or attached to tubular members in any known manner, and may further include flanges 44 attached to the bottom end thereof and having holes for mounting the supports to roof 14 using fasteners or other known means (not shown). Upper mounting arrangement 40 also includes supports 58 attached to horizontal support 55 or tubular members 42a, 42b and extending to rear end 16. A flange 44 is also attached to the end of support 58 mounted to rear end 16. Fasteners or other suitable means (not shown) may be used to attach the flange to rear end 16 in a manner well known.

Figure 4:
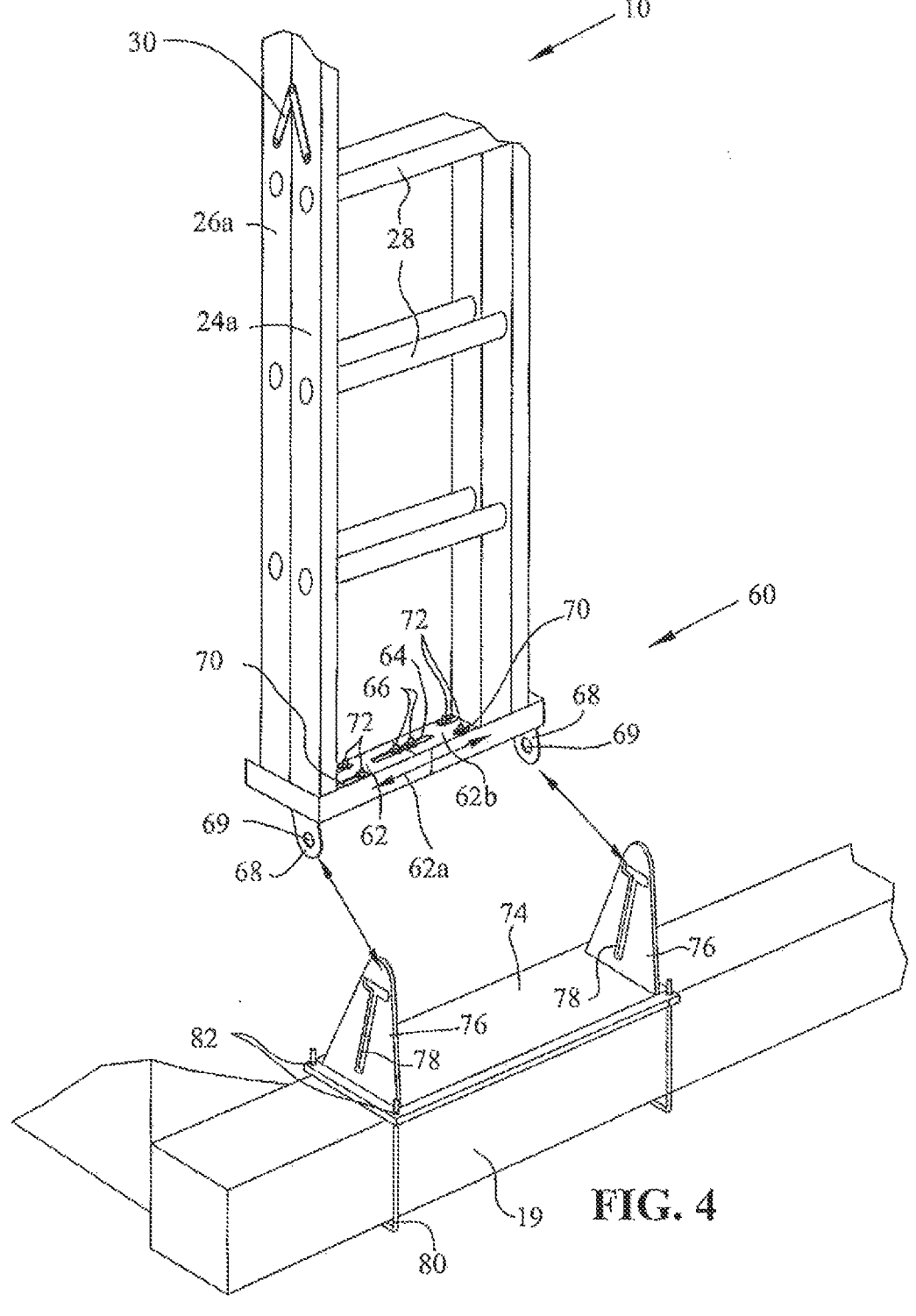
FIG. 4 shows one embodiment for mounting the lower end of the ladder to a bumper of a recreational vehicle.

Lower mounting arrangement 60 is best shown in FIG. 4 and in the embodiment shown, includes an expandable width bracket 62 mounted to legs 24a, 24b. One embodiment for expandable bracket 62 includes overlapping bracket portions 62a, 62b, having a slot 64, wherein the halves may be fixed at a desired width with fasteners 66. Bracket 62 further includes downwardly extending extensions 68 which may be fixedly fastened or otherwise attached to bracket 62 and having apertures 69 extending through lower ends thereof. Extensions 68 may be attached to slots 70 in bracket 62 with fasteners 72.

Figure 5:
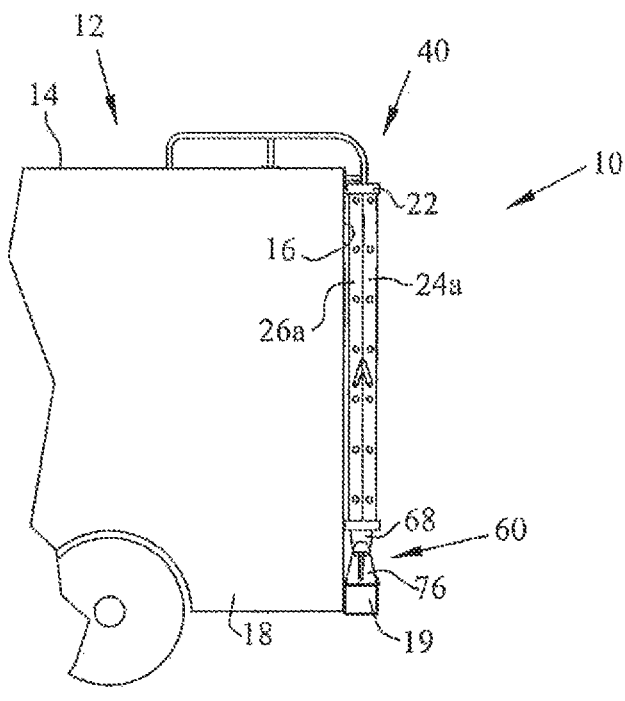
FIG. 5 is a side view showing the lower end of the ladder mounted to the bumper in a manner consistent with FIG. 4.

Lower mounting arrangement 60 further includes a second bracket 74 including extensions 76 extending upwardly therefrom. Each extension 76 includes a generally T-shaped aperture 78, which is configured for mounting extension 76 to extension 68 using fasteners (not shown). The T-shaped apertures in extensions 76 permit a flexible mounting arrangement between brackets 62 and 74. Bracket 74 is mounted to bumper 19 using U-bolts 80 and fasteners 82. FIG. 5 shows a side view with extensions 68 connected to extensions 76.

Figure 6:
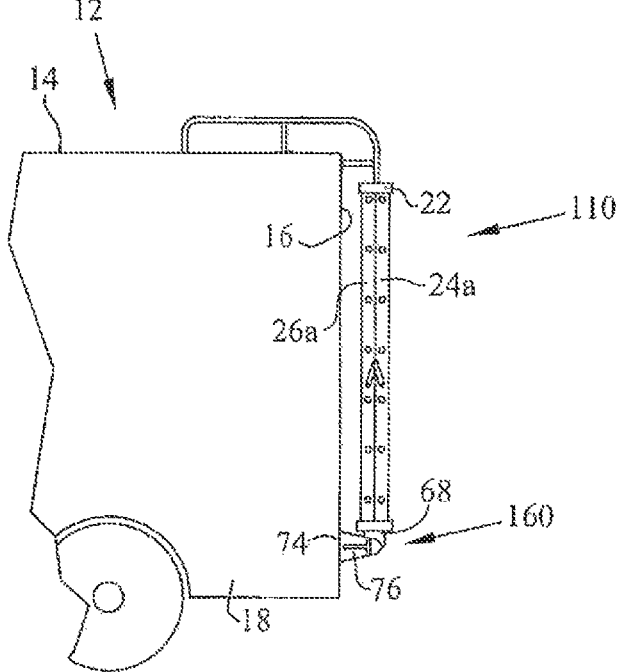
FIG. 6 shows an alternate embodiment arrangement of mounting the lower end of the ladder to a recreational vehicle without a bumper.

FIG. 6 shows an alternate embodiment ladder and mounting arrangement 110, wherein recreational vehicle 12 does not include a bumper 19. In this arrangement, bracket 74 is mounted directly to rear end 16 using fasteners or other known means (not shown) so that extensions 76 extend backwardly perpendicular to rear end 16. Extensions 76 meet extensions 68 at approximately a 90° angle with T-shaped apertures 78 being matched to apertures 69 and held together with fasteners.

Figure 2:
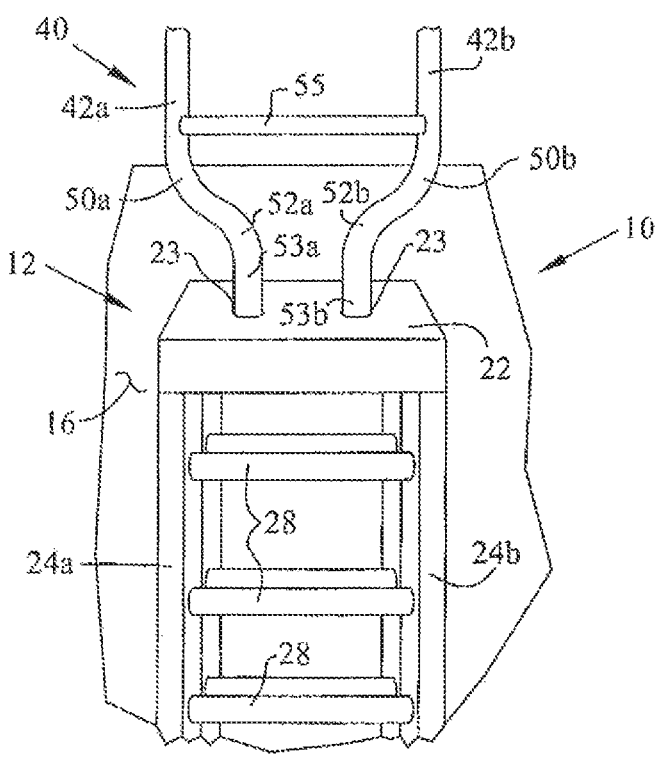
FIG. 2 is an end view of an upper portion of the ladder of FIG. 1 as mounted on the recreational vehicle.
Figure 3:
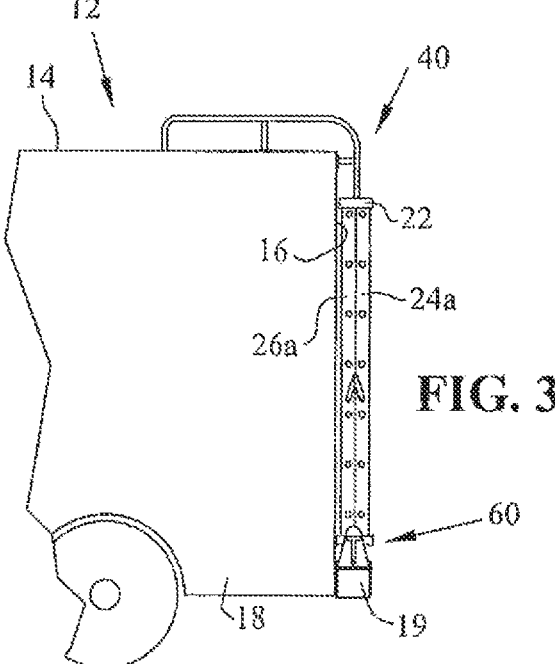
FIG. 3 is a side view of the ladder on the recreational vehicle from FIG. 1.

To mount ladder 10 on recreational vehicle 12, the width of bracket 62 is adjusted to correspond with the width of ladder legs 24a, 24b and fixed using fasteners 66 in slot 64. Bracket 74 is attached to bumper 19 using a U-bolt 80 and fasteners 82 as shown in FIG. 4. Free ends 53a and 53b of tubular members 42a, 42b are then inserted into receiving holes 23 of top end 22 as best shown in FIG. 2. At this point, the lower ends of legs 24a and 24b are positioned within the sides of bracket 62 and extensions 68 of bracket 62 are connected to extensions 76 of bracket 74 using fasteners or other known means to securely connect the extensions together. As should be appreciated, the T-shaped configuration of apertures 78 enables the extensions to be connected together and allow for adjustments to be made if the fit-up does not match perfectly.

To remove the ladder, the fasteners connecting extensions 68 and 76 together are removed, bracket 62 is removed from the bottom of step ladder 10 and top end 22 is drawn down so that free ends 53a, b of tubular members 42a, b, respectively, are withdrawn from receiving holes 23. Ladder 10 can then be opened up and used in a manner of a normal step ladder as is well known. The ladder can be reattached by reversing the process.

Figure 7:
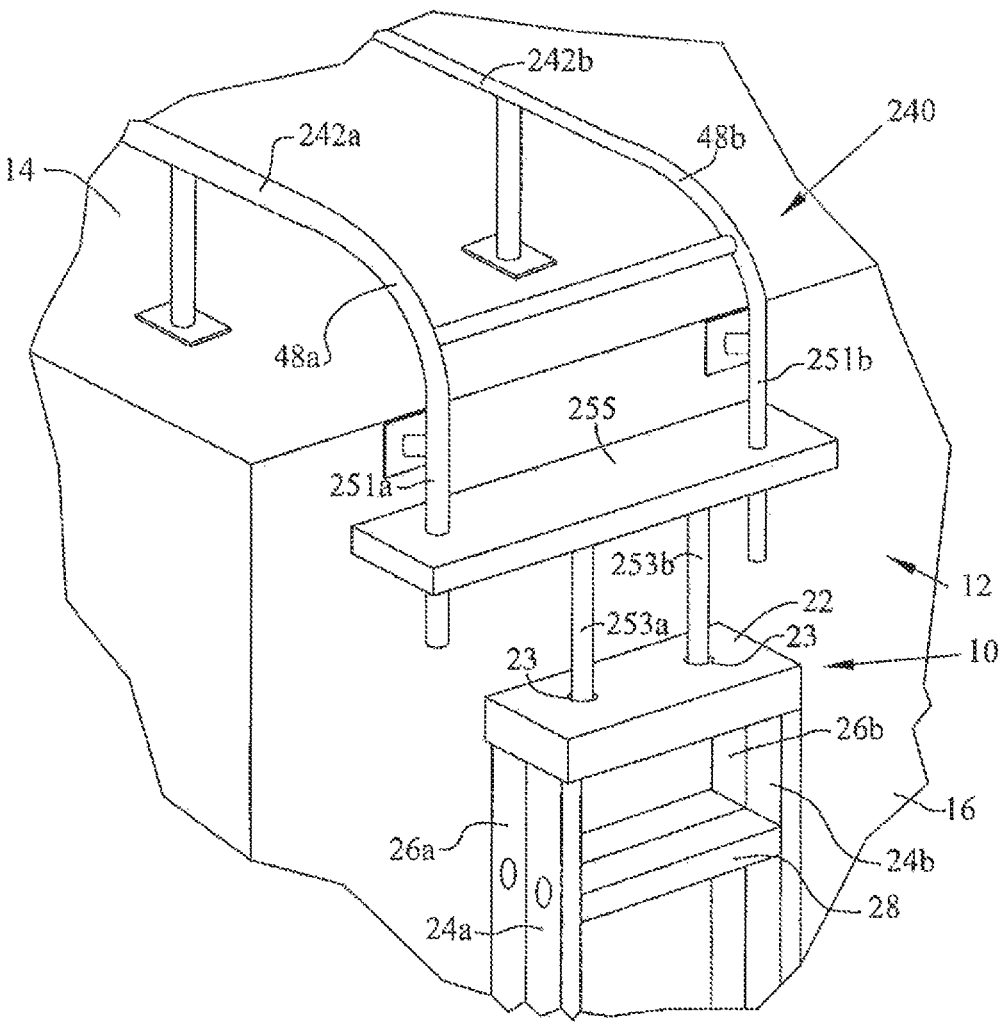
FIG. 7 is a perspective view of an alternate embodiment upper mounting arrangement as mounted on the recreational vehicle.

Referring now to FIG. 7, an alternate embodiment upper mounting arrangement is shown generally indicated as 240. The removable ladder 10 attached to upper mounting arrangement 240 is the same as depicted in FIGS. 1-6. Additionally, upper mounting arrangement 240 can be the same as upper mounting arrangement 40, forward from 90° bends 48a, 48b; however, upper mounting arrangement 240 does not include any bends in tubular members 242a, 242b below bends 48a, 48b. Instead, mounting arrangement 240 includes two vertical segment tubular portions 251a, 251b. Vertical portions 251a, 251b are attached to a horizontal step or support 255. Attached to the bottom of step 255 are vertical tubular portions 253a, 253b, which have free ends configured to extend into and be received by receiving apertures 23 in top end 22 of removable ladder 10. Removeable ladder 10 is attached to upper mounting arrangement 240 in the same or similar manner as with upper mounting arrangement 40, and can be removed in the same or similar manner.

It should be appreciated that as an alternative, vertical portions 253a and 253b can be attached to removable step ladder 10, and step 255 may include receiving apertures for receiving either free lower ends of vertical portions 251a, 251b or free upper ends of vertical portions 253a, 253b as an alternate means of mounting removable step ladder 10 to upper mounting arrangement 240.

Now referring to FIGS. 8-18, an alternate embodiment removable ladder is shown, generally indicated as 310. Removable ladder 310 is removably mounted on a recreational vehicle, generally indicated as 312. Recreational vehicle 312 includes a roof or top 314, a rear or back end 316, a window 317 in back end 316, and a bottom end 318 of back end 316.

Figure 8:
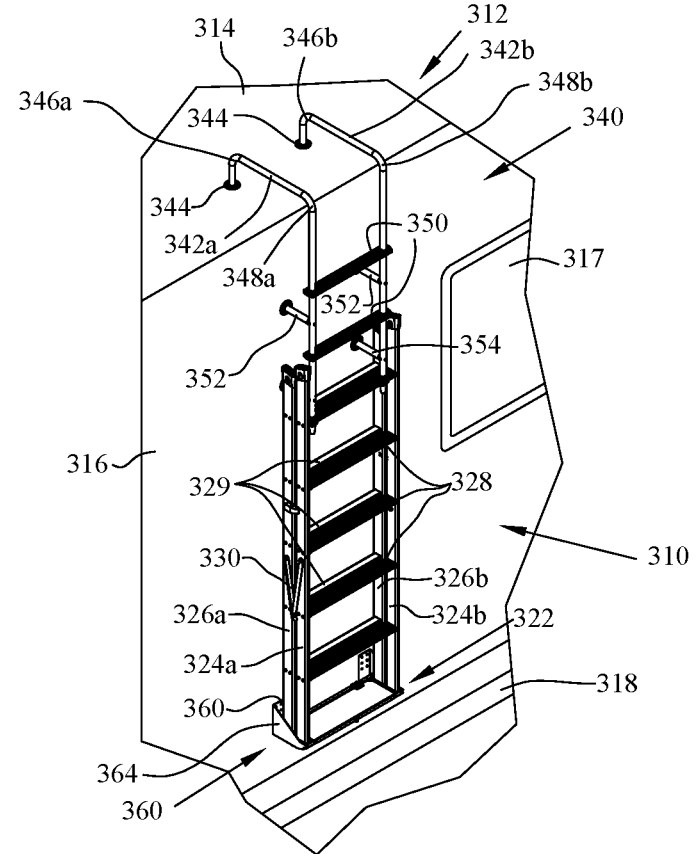
FIG. 8 is a perspective view of an alternate embodiment of the subject invention showing a removable ladder mounted on a recreational vehicle.
Figures 9, 9A:
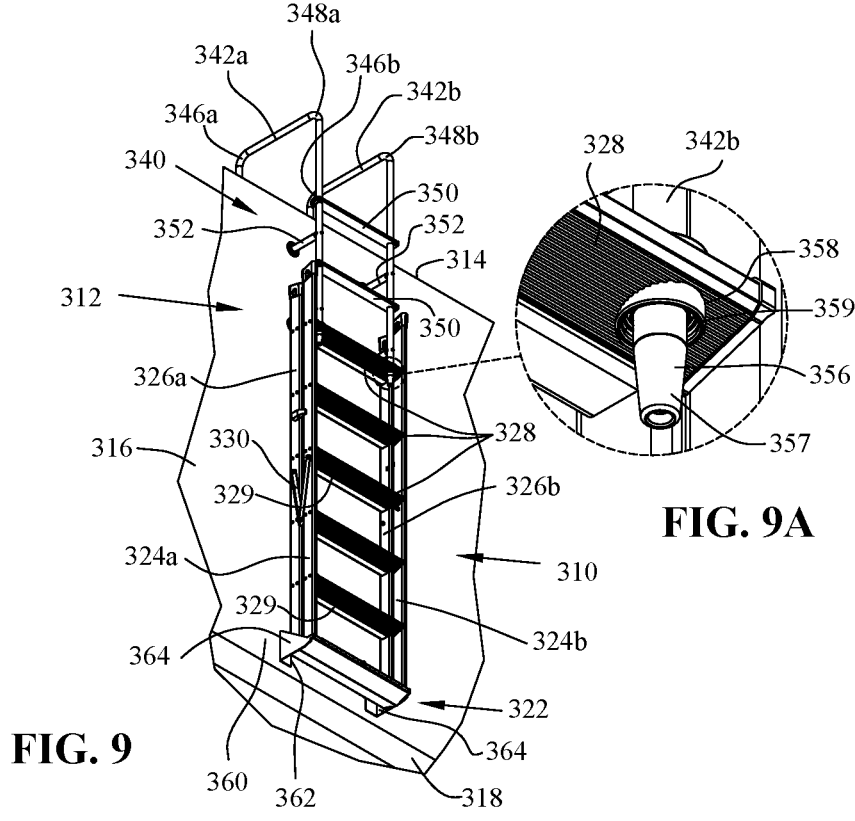
FIG. 9 is a lower perspective of the removable ladder of FIG. 8 mounted on the recreational vehicle.
FIG. 9A is an enlarged view in the area indicted in FIG. 9 wherein the removable ladder receives an end from an upper mounting assembly on the recreational vehicle.
Figures 15, 15A:
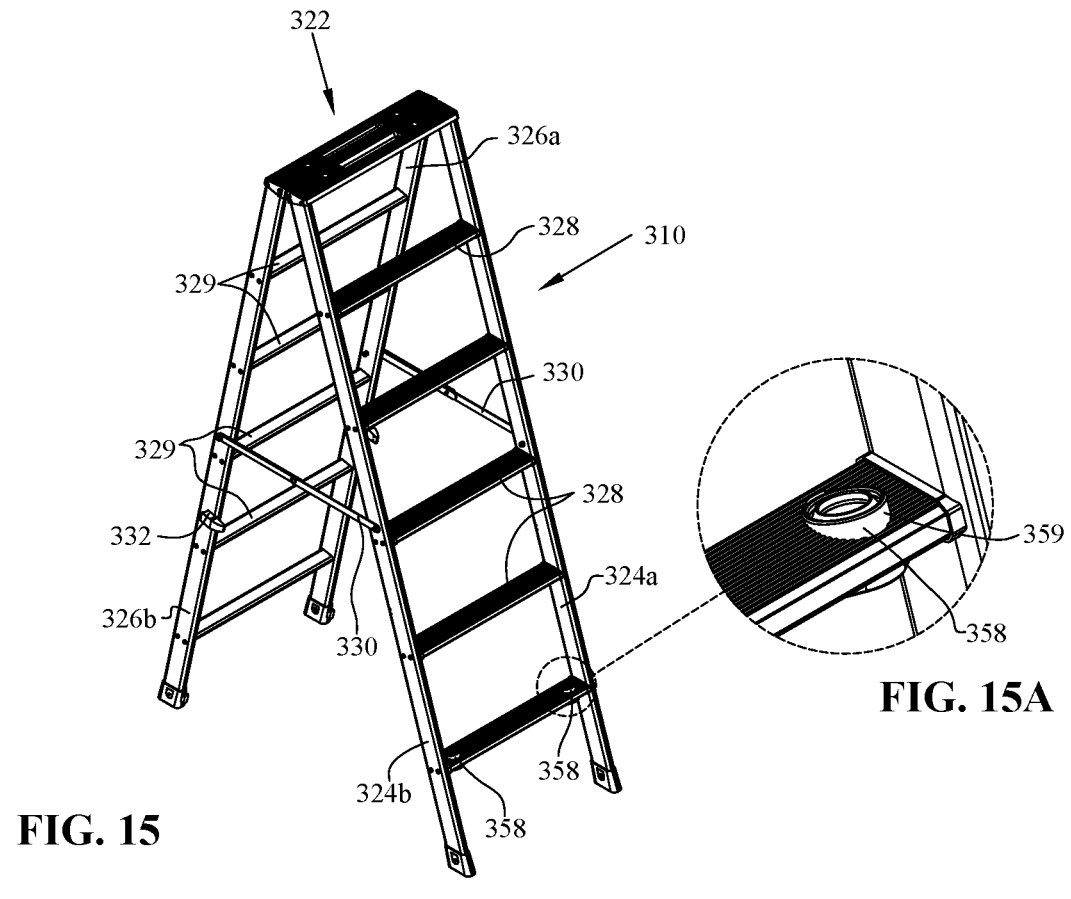
FIG. 15 is a perspective view of the ladder opened up for use.
FIG. 15A is an enlarged view of the area indicated showing a receiving hole in a step for receiving an end of the upper mounting arrangement.
Figure 16:
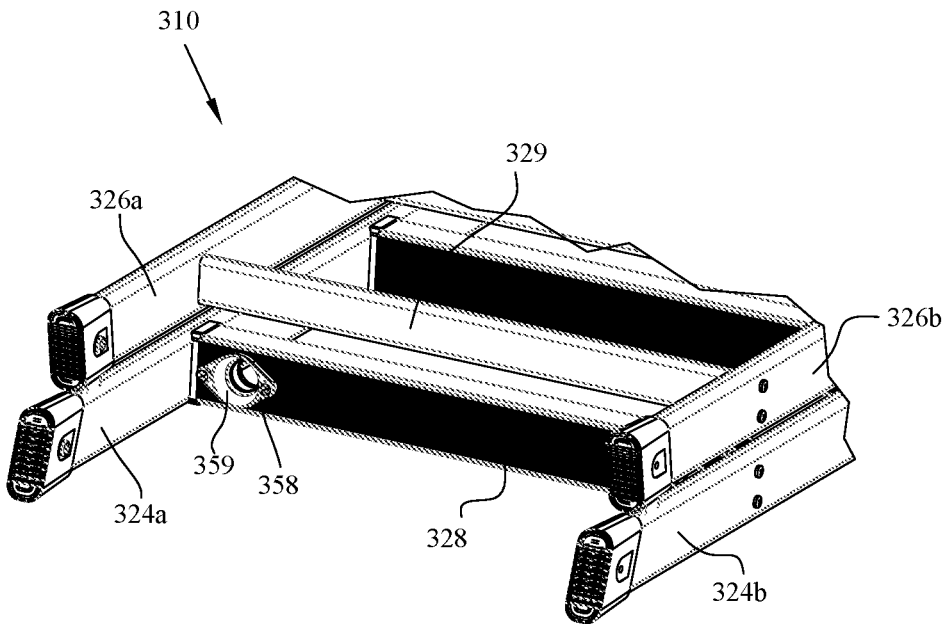
FIG. 16 is a bottom perspective view of the ladder in a folded and closed position and showing the receiving hole in a step of the ladder.

As compared to removable ladder 10, removable ladder 310 is mounted in an inverted orientation on recreational vehicle 312. That is a top end or platform, generally indicated as 322 (as pertains to when the ladder is removed from the recreational vehicle 312 and used as a conventional step ladder) is at a lower or bottom end of ladder 310, when mounted on recreational vehicle 312. Ladder 310 also includes a pair of legs 324 a,b and a second pair of legs 326 a,b., which are pivotally mounted at top end 322. This allows the legs 324 a,b and 326 a, b to be folded together when storing removable ladder 310 on recreational vehicle 312 as shown in FIGS. 8-9, and allows ladder 310 to be swung open to an open use position for use as a ladder when removed from recreational vehicle 312 as shown in FIGS. 15 and 17.

Ladder 310 also includes horizontal rungs or steps 328 extending between and attached to legs 324 a,b and horizontal connectors or braces 329 extending between and attached to legs 326 a,b. It should be appreciated that the number and placement of Steps 328 and braces 329 shown in the Figures are not limited to that shown. The ladder may include more or fewer steps and/or braces from that shown and the placement can be varied. For example, fewer braces may be used and spaced further apart to both reduce weight and to dissuade a user from climbing up the braces. Ladder 310 also includes a pair of pivoting limit stops 330 attached to legs 324 and 326 that limit the outward movement thereof. Ladder 310 also includes a locking latch 332 (see FIG. 14) that can be used to latch legs 324b and 326b. Locking latch 332 is of a type that is known and can be used to hold the ladder legs together when mounted on recreational vehicle 312.

Figures 17, 17A, 18, 18A:
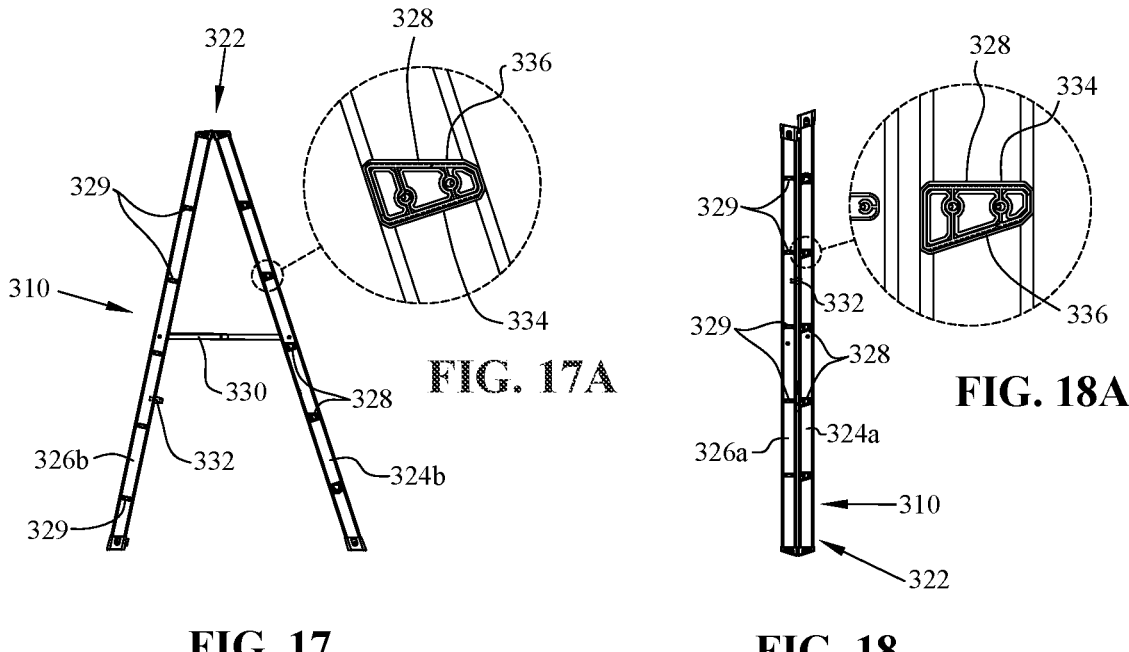
FIG. 17 is a side view of the ladder of FIG. 08 in an opened use position and showing the configuration of the steps.
FIG. 17A is an enlarged view in the area indicated in FIG. 17 showing details of the step configuration.
FIG. 18 is a side view of the ladder of FIG. 08 in a closed folded position and inverted for attachment to the recreational vehicle.
FIG. 18A is an enlarged view in the area indicated in FIG. 18 showing details of the step configuration.

In one embodiment, steps 328 have a cross sectional configuration as shown in FIGS. 17A and 18A. As can be steps 328 have stepping surfaces that are at an angle to one another. A bottom stepping surface 334 is perpendicular to the length orientation of legs 324, and a top stepping surface 336 is at an angle to bottom stepping surface 324. In the embodiment shown, steps 328 have a hollow cross-section and stiffeners contained therein. Steps 328 may be extruded or formed from sheet or other structural members. Steps 328 may also be manufactured from a solid material including but not limited to a metal, fiberglass, wood or composite material.

Accordingly, when ladder 310 is unfolded in a use position and off the recreational vehicle as shown in FIG. 17, bottom stepping surface 334 is at an angle to the ground or horizontal. However, when the ladder is inverted as when it is installed on the recreational vehicle 312 as shown in FIGS. 8, 9, and 18, bottom stepping surfaces 334 are horizontal and parallel to the ground. In this position, horizontal stepping surfaces 334 make it conducive for a user to climb ladder 310, when the ladder is mounted on the recreational vehicle.

Alternately, when ladder 310 is removed from recreational vehicle 312 and opened up and placed in a position for use apart from the vehicle as shown in FIGS. 15 and 17, then top stepping surface 336 is horizontal and parallel to the ground. This makes it conducive for a user to climb ladder 310 when opened up and used as a conventional step ladder.

Now, we will discuss the mounting arrangement for mounting and using ladder 310 on recreational vehicle 312. Recreational vehicle 312 includes an upper ladder mounting arrangement (best shown in FIG. 12), generally indicated as 340. Upper mounting arrangement 340 includes a pair of tubular members 342a, 342b, mounted generally parallel and adjacent to one another. Upper mounting arrangement 340 may be manufactured from aluminum members or other suitable corrosion resistant materials. One end of each tubular member 342a,b has a flange 344 attached thereto, such as by welding or other known means. Flanges 344 may include holes and be attached using fasteners or other known means to roof 314 of recreational vehicle 312. Each tubular member 342a, 342b extends generally vertically upward from flange 344/roof 314, but further includes respective bends 346a, 346b. At the rear end 316 of recreational vehicle 312, tubular members 342a,b include 90° bends 348a, 348b, respectively, directing tubular members downwardly out over rear end 316. In the embodiment shown, upper mounting arrangement 340 also includes a pair of steps 350 attached to and extending between tubular members 342a, 342. Upper mounting arrangement 340 further includes a pair of upper support members 352 and lower support members 354 extending between and attached to rear wall 316 of recreational vehicle 312 and tubular members 342a,b. In the embodiment shown lower ends of tubular members 342a and 342b are free and each include a tapered portion 356. Tapered portions 356 may have an end cap 357 attached thereto, that may be of a softer and less friction resistant material such as plastic, nylon or polytetrafluoroethylene (PTFE), to facilitate inserting the free ends of tubular members 342a,b into receiving holes in a step of ladder 310.

The lower most step 328 of ladder 310 (as the ladder sits in an opened position, when removed from recreational vehicle 12) or the upper most step 328 when the ladder is inverted and attached to the recreational vehicle includes a pair of receiving holes 358 to receive the tapered portion of free ends 356 of tubular members 342a, 342b when the ladder is installed on the recreational vehicle. Receiving holes 358 may include collars or grommets 359 to facilitate receipt and alignment of tubular members 342a, 342b.

Figure 10:
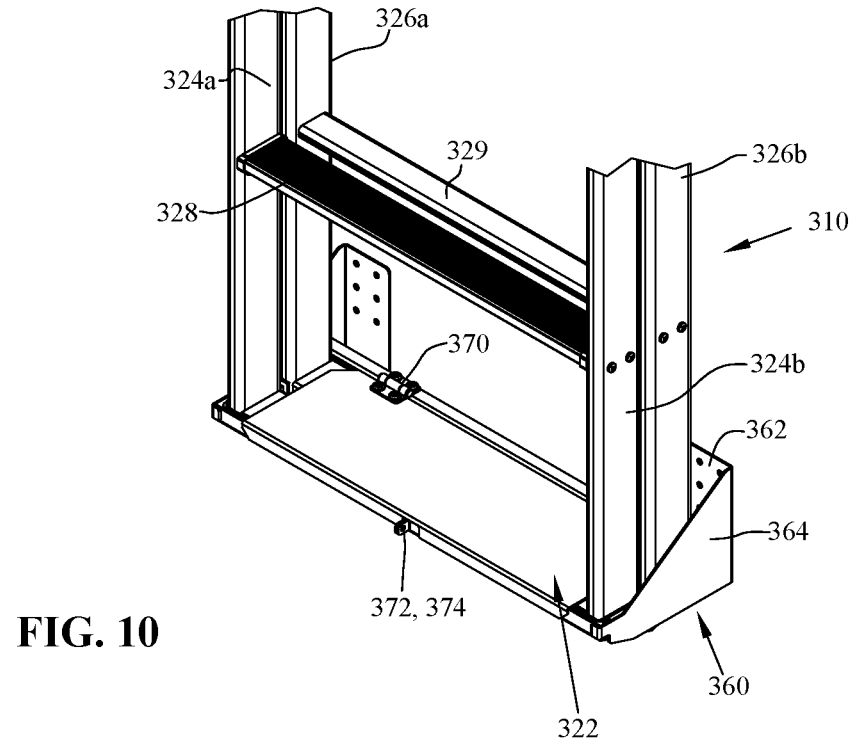
FIG. 10 is a perspective view of the removable step ladder of FIG. 8 mounted and secured in a lower mounting arrangement of the recreational vehicle.
Figure 11:
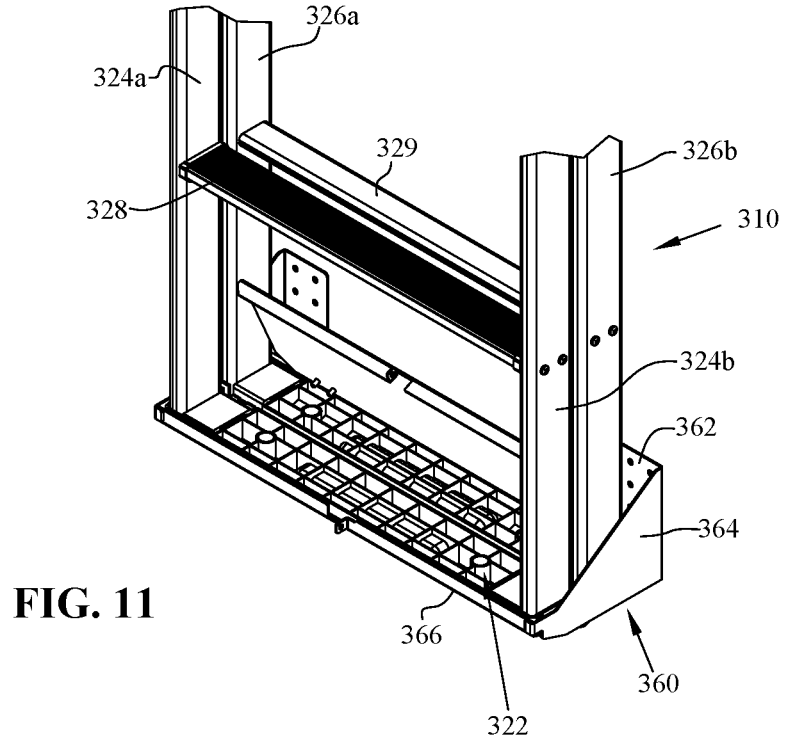
FIG. 11 is a perspective view of the removable step ladder of FIG. 8 with the lower mounting arrangement of the recreational vehicle partially open, so that the ladder can be removed.
Figure 12:
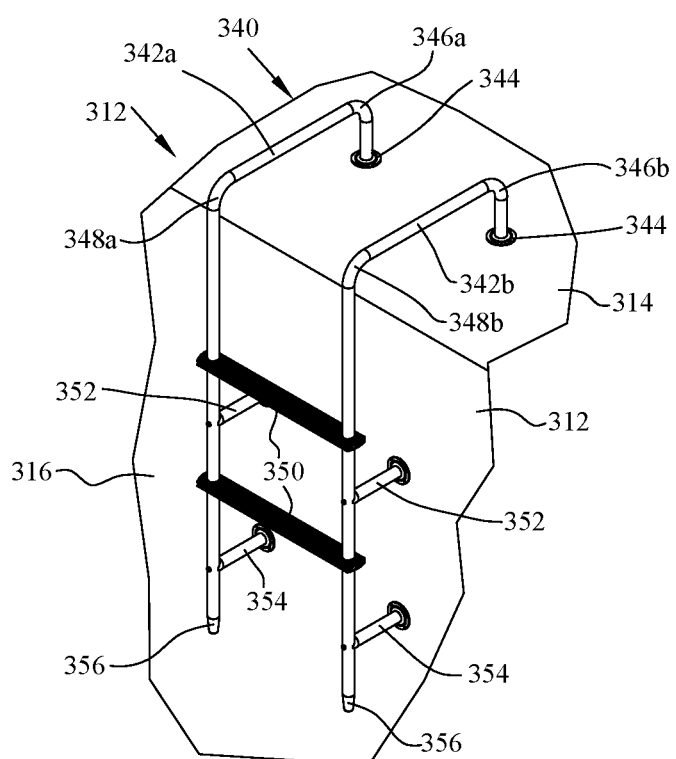
FIG. 12 is a perspective view of the upper mounting assembly of the recreational vehicle with the ladder removed.
Figure 13:
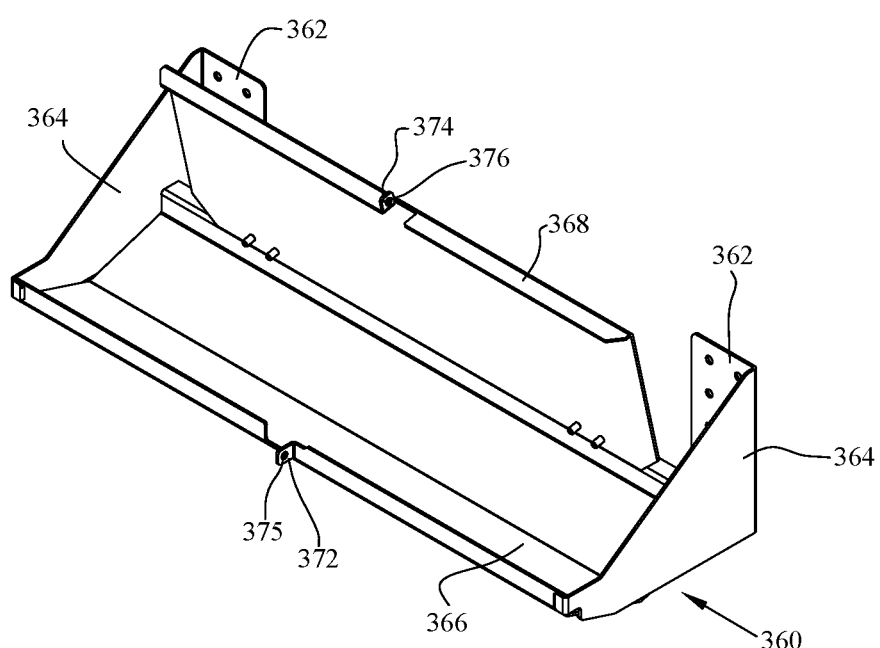
FIG. 13 is a perspective view of the lower mounting arrangement removed from the recreation vehicle for clarity.
Figure 14:
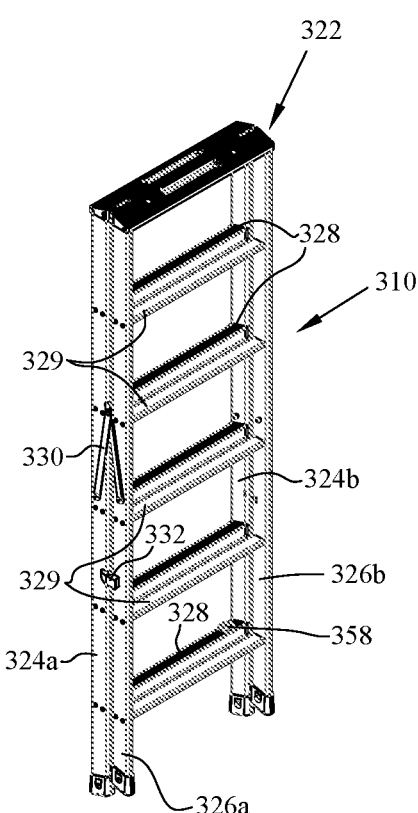
FIG. 14 is a perspective view of the ladder of FIG. 8 removed from the recreational vehicle and in a folded and closed position.

Now referring to FIGS. 8-11 and 13, a lower mounting arrangement for mounting ladder 310 to recreational vehicle 312 is shown generally indicated as 360. In the embodiment shown, lower mounting arrangement 360 includes a back panel or a pair of back panel sections 362, which are mounted to the rear end 316 of recreational vehicle 312 using fasteners or other known means of attachment. Lower mounting arrangement 360, also includes a pair of side panels 364 which are spaced apart and configured to receive the top end 322 of ladder 310 therebetween. Lower mounting arrangement 360 also includes a lower platform 366 and a securing panel 368. Securing panel 368 is attached to lower platform with hinges 370, which allow the securing panel 368 to pivot up and down as shown in FIGS. 10, 11 and 13 to allow ladder 310 to be mounted to recreational vehicle 312 or to be removed therefrom. The securing panel 368 can be used to secure top end 322 of ladder 310 to the lower mounting arrangement. To secure the ladder, the top end 322 is paced downward in lower platform 366, while securing platform 368 is raised as shown in FIG. 13, and then securing panel 368 is swung down as facilitated by hinges 370 to enclose top end 322 between lower platform 366 and securing platform 368. Referring to FIGS. 10 and 13, it can be seen the lower platform 366 has an extension 372 and securing panel 368 includes and extension 374. Each of the extensions has an aperture 375, 376, respectively, therethrough that align with one another when the securing panel 368 is closed about top end 322 as shown in FIG. 10. A shackle of a padlock or key lock can be inserted through apertures 375 and 376 to lock securing panel 368 about top end 322 of ladder 310 to prevent the ladder from being removed accidently or without permission.

Figure 19:
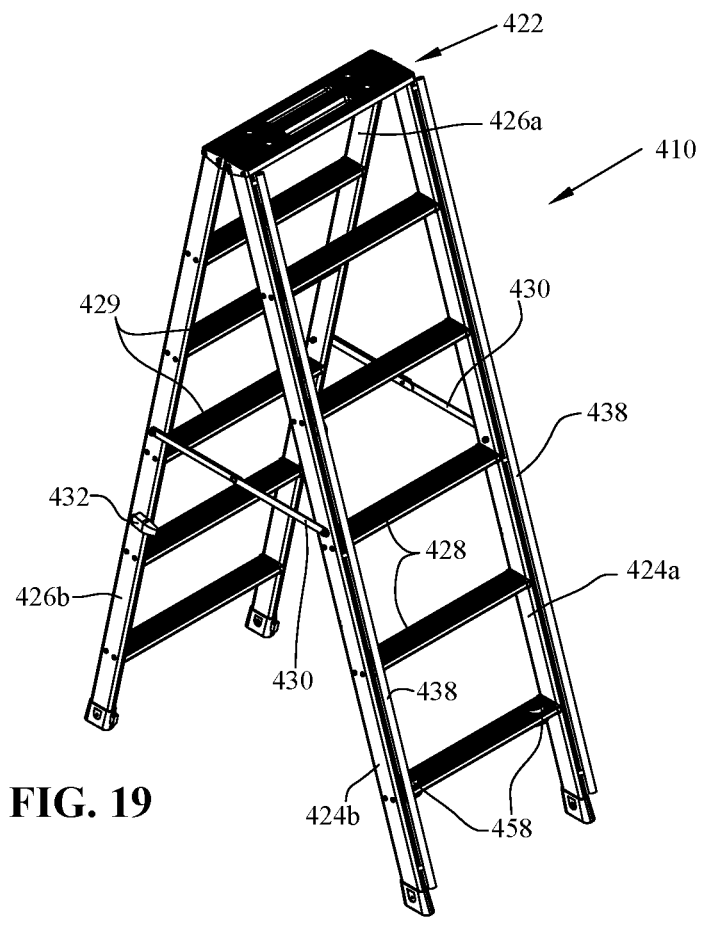
FIG. 19 is yet another alternate embodiment ladder removed from the recreational vehicle and opened up for use.

Now referring to FIG. 19, another alternate embodiment ladder is shown generally indicated as 410. Ladder 410 is similar in many respects as ladder 310 and is designed to be stored/attached to a recreational vehicle and removed therefrom for use as a standard step ladder in the same manner as ladder 310. Ladder 410 includes a pair of legs 424 a,b and a second pair of legs 426 a,b., which are pivotally mounted at top end 422. This allows the legs 424 a,b and 426 a,b to be folded together when storing removable ladder 410 on a recreational vehicle as with ladder 310 and allows ladder 410 to be swung open to an open use position for use as a standard step ladder when removed from the recreational vehicle as shown in FIGS. 19.

Ladder 410 also includes horizontal rungs or steps 428 extending between and attached to legs 424 a,b and horizontal rungs or steps 429 extending between and attached to legs 426 a,b. Accordingly, this allows a user to climb up either side of ladder 410 when it is opened in a use position as shown in FIG. 19. Steps 428 and 429 can have a similar cross-section configuration and construction as steps 328 of ladder 310. Ladder 410 also includes a pair of pivoting limit stops 430 attached to legs 424 and 426 that limit the outward movement thereof. Ladder 410 also includes a locking latch 432 (see FIG. 19) that can be used to latch legs 424b and 426b. Locking latch 332 is of a type that is known and can be used to hold the ladder legs together when mounted on recreational vehicle 312.

In the embodiment shown, ladder 410 as includes a pair of side rails 438 attached to and extending along legs 424a, 424b, respectively. Side rails 438 can be used to assist in climbing ladder 410 when mounted on the recreational vehicle and can also be used as handles to assist in removing ladder 410 from the recreational vehicle. Similar to ladder 310, ladder 410 also has receiving holes 458 in the lower most step 428, for receiving the free ends of the tubular members of the upper mounting arrangement.

Now referring to FIGS. 20-23, an alternate embodiment upper mounting arrangement or assembly is generally indicated as 540. Upper mounting arrangement 540 includes a pair of tubular members 542a, 542b, mounted generally parallel and adjacent to one another. Upper mounting arrangement 540 can be manufactured from aluminum members or other suitable corrosion resistant materials. One end of each tubular member 5342a,b has a flange 544 attached thereto, such as by welding or other known means. Flanges 544 may include holes and be attached using fasteners or other known means the roof of the recreational vehicle. Each tubular member 542a, 542b extends generally vertically upward from flange 544 and the roof of the recreational vehicle, but further includes respective bends 546a,546b. At the rear end of the recreational vehicle, tubular members 542a,b include 90° bends 548a, 548b, respectively, directing tubular members downwardly out over the rear end of the recreational vehicle. In the embodiment shown, upper mounting arrangement 540 also includes a pair of steps 550 attached to and extending between tubular members 342a, 342, but it should be appreciated that more or less steps may be included in the upper mounting arrangement 540. Upper mounting arrangement 540 further includes a pair of upper support members 552, each having a flange 553 attached thereto, and lower support members 554, each having a flange 555 attached thereto and extending between and attached to the rear wall of the recreational vehicle and tubular members 542a,b. In the embodiment shown lower ends of tubular members 542a and 542b are free and each include a tapered portion 556.

Figure 23:
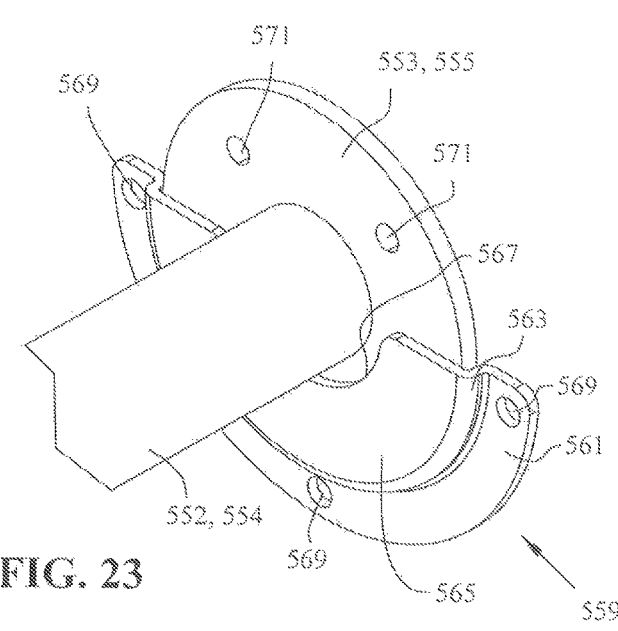
FIG. 23 is a perspective view of a flange of a support member of the upper mounting arrangement being received in and held by a mounting bracket.

Mounting assembly 540 also includes a set of mounting brackets 559, which in the embodiment shown have a generally semicircular configuration. Each mounting bracket includes a mounting flange 561 extending around the exterior annular part thereof. On the interior side off each flange 561, an offset 563 leads to a receiving portion 565 in the central area of mounting brackets 559. Receiving portions 565 are configured to receive and hold flanges 553 and 555 on upper and lower supports 552 and 554, respectively. Receiving portions 565 include semicircular cut-outs 567 to accommodate upper and lower supports 552 and 554 as is best shown in FIG. 23. For attaching mounting brackets 559 and upper and lowers supports 552 and 554 to the back of the recreational vehicle, mounting flanges 561 include attaching holes 569 and Flanges 553 and 555 include attaching holes 571 for attaching upper mounting assembly 540 to the rear of a recreational vehicle.

Figure 20:
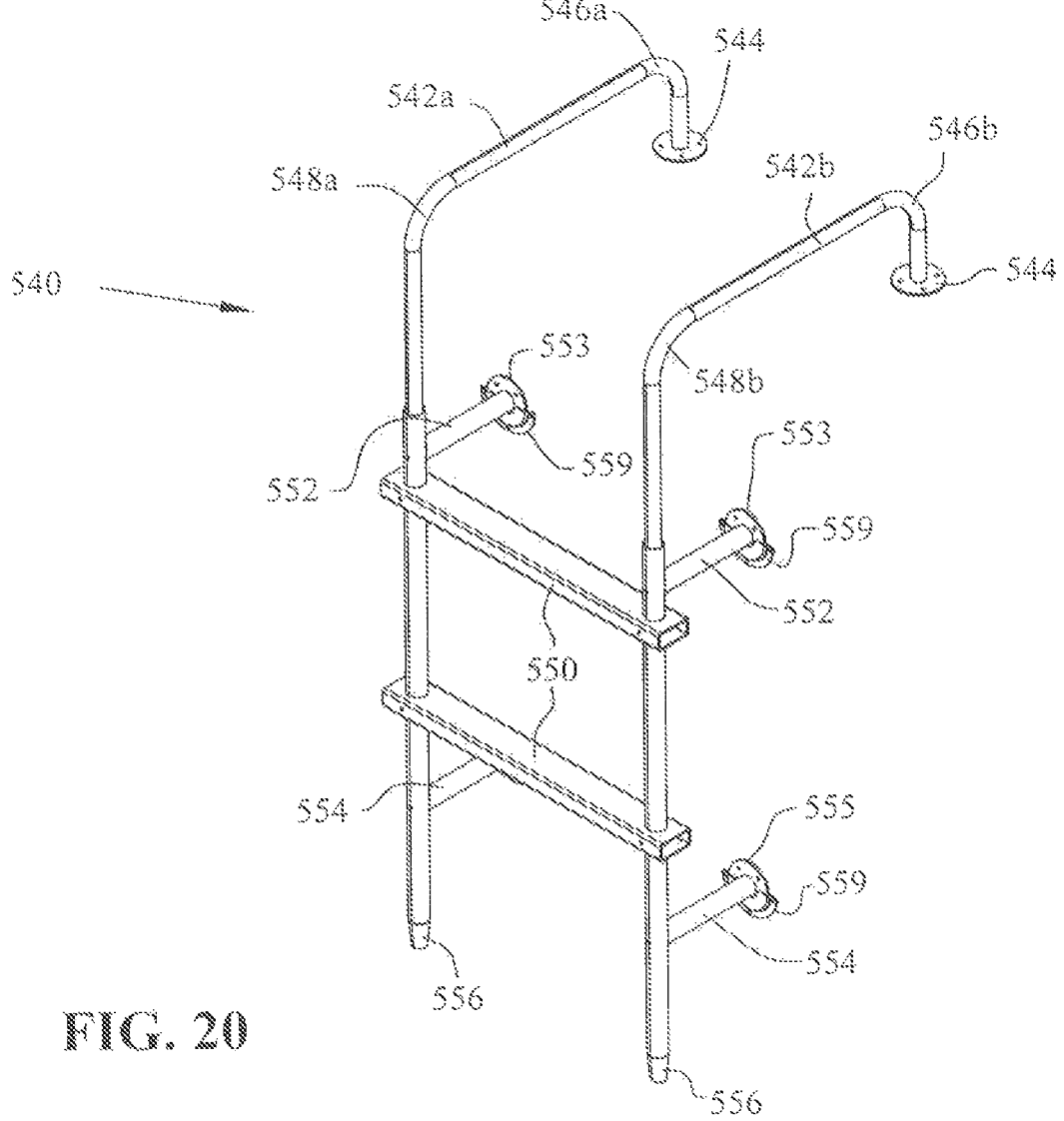
FIG. 20 is a perspective view of an alternate embodiment upper mounting arrangement and mounting brackets for attaching the upper mounting arrangement to the recreational vehicle.
Figure 21:
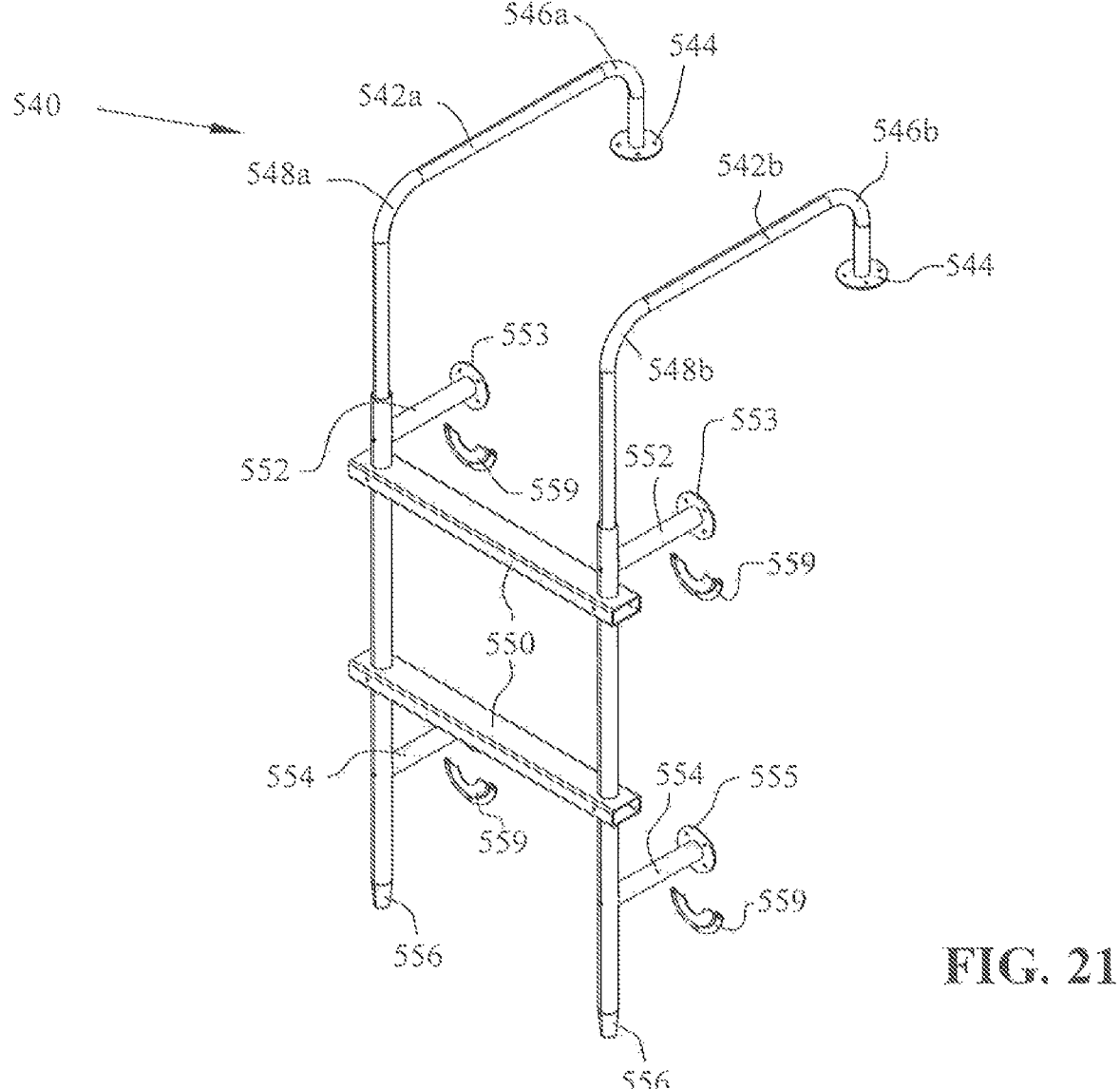
FIG. 21 is a perspective view of the upper mounting arrangement and mounting brackets of FIG. 20 shown with the upper mounting arrangement removed from the brackets.
Figure 22:
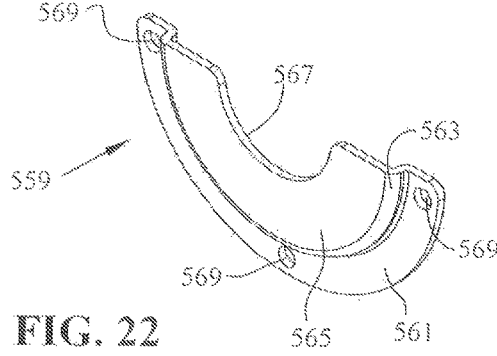
FIG. 22 is a perspective view of a mounting bracket.

To attach upper mounting assembly 540 to the recreational vehicle, mounting brackets 560 are affixed using screws, bolts or other fasteners inserted through holes 569 and into the rear of the recreational vehicle. Then flanges 553 and 555 are inserted into receiving portions 565 as shown in FIGS. 20 and 23. The flanges are then affixed to the recreational vehicle using screws, bolts or other fasteners inserted through the top two attaching holes in flanges 553 and 555. As should be appreciated by one skilled in the art, mounting brackets 559 facilitate ease of placement, attachment, and removal of upper mounting arrangement 540 to the recreational vehicle. It should also be appreciated that similar mounting brackets could be used to attach the lower mounting arrangement.

While the invention has been taught with specific reference to these embodiments, one skilled in the art will recognize that changes can be made in form and detail without departing from the spirit and scope of the invention. For example, bracket 62 does not have to have an adjustable width or other adjustment configurations may be used. Also, receiving apertures 23 may be replaced with sockets attached to top end 22. The described embodiments are to be considered, therefore, in all respects only as illustrative and not restrictive. As such, the scope of the invention is indicated by the following claims rather than by the description.

The invention claimed is:

1. A ladder and recreational vehicle combination, the ladder removably mountable on the recreational vehicle, wherein the ladder is a foldable ladder, the combination comprising:

the ladder including a top end and two pairs of legs extending downward from the top end, at least one of the pairs of legs being pivotally mounted to the top end, and a pivoting connection allowing the pairs of legs to fold adjacent one another or unfold to a use position;

an upper mounting arrangement attached to the recreational vehicle, the arrangement including at least one horizontal ladder rung and two free ends extending downwardly therefrom; and a bottom step of the ladder having a pair of receiving holes extending therethrough configured to receive the free ends of the upper mounting arrangement.

2. The ladder and recreational vehicle combination as set forth in claim 1, wherein the top end of the ladder is configured to be received and secured in a lower mounting arrangement.

3. The ladder and recreational vehicle combination as set forth in claim 1, wherein the free ends are tubular members of the upper mounting arrangement.

4. The ladder and recreational vehicle combination as set forth in claim 3, wherein the tubular members have tapered ends attached thereto.

5. The ladder and recreational vehicle combination as set forth in claim 2, wherein the lower mounting arrangement includes a lower platform and securing panel.

6. The ladder and recreational vehicle combination as set forth in claim 5, including side panels on the lower mounting arrangement configured to receive the pairs of legs therebetween.

7. The ladder and recreational vehicle combination as set forth in claim 6, including at least one back mounting member to mount the lower mounting arrangement to the recreational vehicle.

8. The ladder and recreational vehicle combination as set forth in claim 7, wherein the securing panel is pivotally attached to the lower platform, to facilitate moving the securing panel to an open receiving position to allow the lower mounting arrangement to receive the top end of the ladder.

9. The ladder and recreational vehicle combination as set forth in claim 8, wherein the securing panel is pivoted downward to secure the top end of the ladder in the lower mounting arrangement.

10. The ladder and recreational vehicle combination as set forth in claim 9, including extensions on the securing panel and lower platform with aligned apertures in the extensions.

11. The ladder and recreational vehicle combination as set forth in claim 10, wherein the lower mounting arrangement is mounted to the back end of the recreational vehicle.

12. The ladder and recreational vehicle combination as set forth in claim 1, wherein steps of the ladder have a cross-sectional configuration that includes a bottom stepping surface and a top stepping surface, the bottom stepping surface and top stepping surface being at an angle to one another.

13. The ladder and recreational vehicle combination as set forth in claim 12, wherein the bottom stepping surface is perpendicular to the length of the legs and horizontal when mounted on the recreational vehicle to be used as a stepping surface for a user climbing the ladder on the recreational vehicle.

14. A ladder and mounting assembly combination, removably mountable on a recreational vehicle, wherein the ladder is a foldable ladder, the combination comprising:

the ladder including a top end and two pairs of legs extending downward from the top end, at least one of the pairs of legs being pivotally mounted to the top end, and a pivoting limiting mechanism allowing the pairs of legs to fold adjacent one another or unfold to a use position for use when removed from the recreational vehicle; and a lower mounting arrangement for attaching the ladder to a recreational vehicle, the lower mounting arrangement including a lower platform and securing panel, wherein the securing panel is pivotally attached to the lower platform, to facilitate moving the securing panel to an open receiving position to allow the lower mounting arrangement to receive the top end of the ladder, the lower mounting arrangement configured to support and hold the ladder in an inverted position when mounted to the recreational vehicle, such that the top end of the ladder is facing downward and a bottom end of the ladder is facing upward; and an upper mounting arrangement attached to the recreational vehicle, the arrangement including at least one horizontal ladder rung and tubular members each having free ends extending downwardly therefrom.

15. The ladder and mounting assembly combination as set forth in claim 14, wherein the securing panel is pivoted downward to secure the top end of the ladder in the lower mounting arrangement.

16. The ladder and mounting assembly combination as set forth in claim 15, including extensions on the securing panel and lower platform with aligned apertures in the extensions.

17. The ladder and mounting assembly combination as set forth in claim 14, wherein a bottom step of the ladder has a pair of receiving holes extending therethrough configured to receive the free ends of the upper mounting arrangement.

18. The ladder and mounting assembly as set forth in claim 17, wherein the free ends of the tubular members are tapered.

19. The ladder and mounting assembly as set forth in claim 14, including mounting brackets having receiving portions to receive flanges on support members of the upper mounting arrangement.

* * * * *